United States Patent
Fukumoto et al.

[11] Patent Number: 6,131,632
[45] Date of Patent: Oct. 17, 2000

[54] HEAVY DUTY RADIAL TIRE WITH SPECIFIED BELT CUSHION RUBBER

[75] Inventors: Tetsuhiro Fukumoto, Kobe; Takako Kitamura, Nara-ken, both of Japan

[73] Assignee: Sumitomo Rubber Industries, Ltd., Hyogo-Ken, Japan

[21] Appl. No.: 09/247,522

[22] Filed: Feb. 10, 1999

[30] Foreign Application Priority Data

Feb. 10, 1998 [JP] Japan .................................. 10-028737

[51] Int. Cl.⁷ ................ B60C 3/04; B60C 9/18; B60C 9/20; B60C 9/28
[52] U.S. Cl. .............. 152/454; 152/526; 152/532; 152/537; 152/538
[58] Field of Search ...................... 152/454, 532, 152/538, 526, 537

[56] References Cited

U.S. PATENT DOCUMENTS 5,360,047  11/1994  Fujiwara ............................ 152/538 X

FOREIGN PATENT DOCUMENTS 63-103705  5/1988  Japan .

Primary Examiner—Adrienne C. Johnstone
Attorney, Agent, or Firm—Birch, Stewart, Kolasch & Birch, LLP

[57] ABSTRACT

A heavy duty radial tire has an aspect ratio of not more than 80% and comprises a radial carcass; a belt comprising a first ply, a second ply and a third ply disposed in this order from the radially inside to the outside; the second ply being widest and the axial width BW thereof being in the range of from 1.00 to 2.00 times the section height H of the tire; a first rubber thickness d1 measured from the first belt ply's edge to the carcass being in the range of from 1.0 to 5.0 mm; a second rubber thickness d2 measured from the third belt ply's edge to the second belt ply being more than the first rubber thickness d1; an axial distance W1 of the first belt ply's edge from the second belt ply's edge and an axial distance W2 of the third belt ply's edge from the second belt ply's edge satisfying the following condition: 0<=W1-W2<=5.0 mm; a cushion rubber disposed between the first belt ply and the carcass so as to provide the above-mentioned first rubber thickness d1, the cushion rubber tapering axially inwardly so as to have an axially inner end at an axial distance W0 of 10.0 to 25.0 mm from the axially outer end of the first belt ply.

3 Claims, 3 Drawing Sheets

HEAVY DUTY RADIAL TIRE WITH SPECIFIED BELT CUSHION RUBBER

BACKGROUND OF THE INVENTION

1. Field of the Invention

The present invention relates to a pneumatic tire, more particularly to a heavy duty radial tire in which belt edge loosening can be effectively prevented.

2. Description of Related Art

Heavy duty radial tires for trucks, buses and the like having a relatively low aspect ratio are provided radially outside the carcass with a rigid belt which is generally composed of three or four plies of steel cords.

When the aspect ratio is less than 80% and the width of the belt exceeds the sectional height of the tire in particular, a strain at the belt edges caused when the tire rides over a curbstone and the like becomes relatively large, and at the edges of the radially innermost belt ply, a belt edge loosening failure is liable to occur. Thus, it is difficult to maintain the durability of such low aspect ratio tires.

In the laid-open Japanese Patent application JP-A-63-103705, a heavy duty radial tire is disclosed, wherein, in order to prevent the tread rubber from being separated from the edges of a four-ply belt, as shown in FIG. 3, a distance d2 of 1.5 to 4.5 mm is provided between the edges of the third belt ply b3 and the radially inner second belt ply b2. The exemplified tire is a 10.00R20-14PR tire, and the distance d1 between the edge of the inner belt ply b1 and the carcass (a) is depicted in a figure as being larger than (about twice) the distance d1.

SUMMARY OF THE INVENTION

It is an object of the present invention to provide a heavy duty radial tire in which belt edge loosening is effectively prevented.

According to the present invention, a heavy duty radial tire having an aspect ratio of not more than 80%, comprises a carcass comprising a ply of cords arranged at an angle of from 70 to 90 degrees with respect to the tire equator, a belt comprising three plies of parallel cords disposed radially outside the carcass, the three plies including a first ply, a second ply and a third ply which are disposed in this order from the radially inside to the outside, said second ply being widest in the three belt plies and the axial width BW thereof being in the range of from 1.00 to 2.00 times the section height H of the tire, a first rubber thickness d1 defined as the minimum distance from the axially outer end of the first belt ply to the carcass being in the range of from 1.0 to 5.0 mm, a second rubber thickness d2 defined as the minimum distance from the axially outer end of the third belt ply to the second belt ply being more than said first rubber thickness d1, an axial distance W1 of the axially outer end of the first belt ply from the axially outer end of the second belt ply and an axial distance W2 of the axially outer end of the third belt ply from the axially outer end of the second belt ply satisfying the following condition: $0 <= W1-W2 <= 5.0$ mm, a cushion rubber disposed between the first belt ply and the carcass so as to provide said first rubber thickness d1, said cushion rubber tapering axially inwardly so as to have an axially inner end at an axial distance W0 of 10.0 to 25.0 mm from the axially outer end of the first belt ply, Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described in detail in conjunction with the accompanying drawings.

DESCRIPTION OF THE PREFERRED EMBODIMENTS

Figure 1:
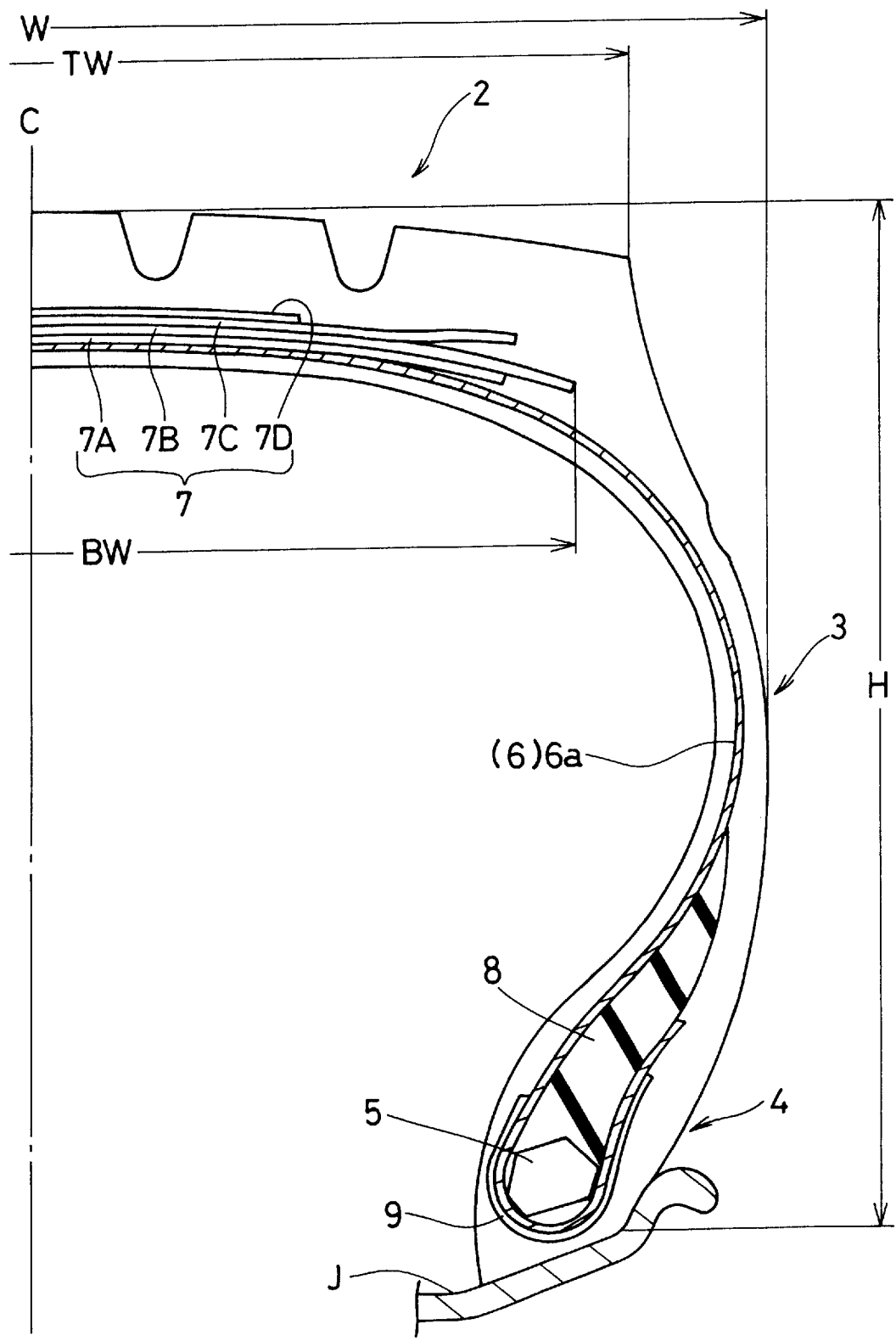
FIG. 1 is a cross sectional view of an embodiment of the present invention.
Figure 2:
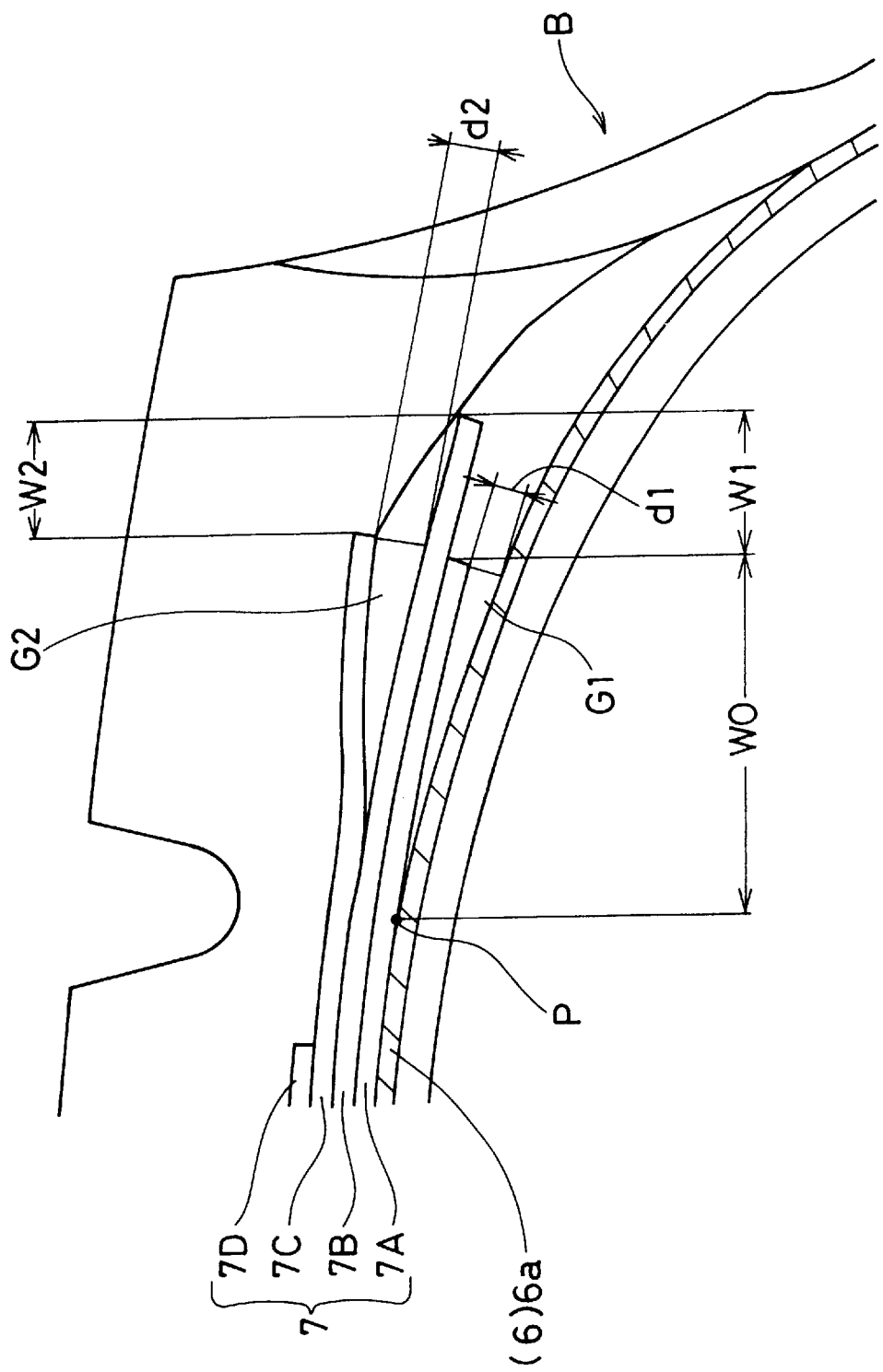
FIG. 2 is an enlarged cross sectional view showing the belt edge thereof.

In the drawings, a heavy duty radial tire according to the present invention comprises a tread portion 2, a pair of sidewall portions 3, a pair of bead potions 4 with a bead core 5 therein, a carcass 6 extending between the bead portions 4 through the tread portion 2 and sidewall portions 3, and a belt 7 disposed radially outside the carcass 6 in the tread portion 2.

The tire has an aspect ratio (section height H/section width W) of not more than 80% (in this embodiment 65%). In FIG. 1, the tire is mounted on a standard rim J and is inflated to a standard pressure but loaded with no tire load. The tire dimensions described later are measured in this condition. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

The carcass 6 is composed of at least one ply extending between the bead portions through the tread portion 2 and the sidewall portions 3 and turned up around the bead cores 5 in the bead portions 4 to be secured thereto. The carcass in this embodiment is composed of a single ply 6a. The carcass ply 6a is made of cords arranged radially at an angle of from 70 to 90 degrees with respect to the tire equator C. For the carcass cords, steel cords are used in this embodiment, but organic fiber cords, e.g. nylon, rayon, polyester and the like can be used. Between the main portion and each turnup portion of the carcass ply 6a, a bead apex 8 made of a tapered hard rubber compound is disposed.

The belt 7 is composed of a plurality of plies of rubberized cords which include at least two cross plies. The belt 7 in this embodiment is composed of a first ply 7, second ply 7B, third ply 7C and fourth ply 7D which are disposed radially outwardly from the carcass 6 in this order. The cord angle of the first ply 7A is a relatively large angle of from 45 to 70 degrees with respect to the tire equator C. The cord angle of each of the second, third, and fourth belt plies 7B to 7D is a small angle of from 10 to 40 degrees with respect to the tire equator C. In this example, with respect to the tire equator C, the cords of the second ply 7B are inclined in the reverse direction to the cords of the third ply 7C. The four belt plies are each made of steel cords. The fourth belt ply 7D is narrowest in axial width, and the second belt ply 7B is widest. The maximum axial width BW of the belt, which is thus the width of the second ply 7B in this example, is in the range of from 1.00 to 2.00 times, preferably 1.10 to 1.40 times the tire section height H. The ratio (BW/TW) of the maximum axial width BW and the tread width TW is preferably set in the range of from 0.85 to 1.10. The ply width of the first belt ply 7A is smaller than the second belt ply 7B but larger than the fourth belt ply 7D and further, the same as or less than the third belt ply 7C. (In this example, 7C<7A<7C<7B)

In the meridian section of the tire, the first and second belt plies 7A and 7B are curved by a convex arc having a curvature which is similar to that of the outmost carcass ply 6a and of which center is located on the tire equator. The curvature of the first ply 7A is set to be slightly larger than that of the radially outmost carcass ply 6a. As a result, a space is formed between the carcass 6 and each of the axially outer edges of the first belt ply 7A, though the first ply 7A contacts with the second ply 7B over the entire width.

In this space, a cushion rubber G1 is disposed. Under the first and second belt plies 7A and 7B, the cushion rubber G1 tapers from the belt edge to the axially inner end P thereof. Further, it tapers from the belt edge P to the axially outer end which is located in the upper sidewall portion B (buttress region).

Because the cushion rubber G1 is subjected to a high strain when the tire rides over a curbstone, for example, an appropriate hardness (flexibility) is required to prevent the cushion rubber from cracking due to such strain. Therefore, it is specifically preferable that the rubber has an elongation at breakage EB of 480 to 520%, a tensile strength TB of 28.0 to 32.0 MPa, a tearing strength TR of 580 to 630 N/cm and a mass change Dm of 300 to 330%.

The elongation at breakage EB and tensile strength TB are measured according to Japanese Industrial Standard (JIS) K6251 "Tensile testing methods for vulcanized rubber", using a specimen of "Dumbbell type No.3". The tearing strength TR is measured according to JIS K6252 "Tear test methods for vulcanized rubber", using a specimen of "(b) Notched angle type". The mass change Dm (swell) is measured according to JIS K6258 "Testing methods of the effect of liquids for vulcanized rubber", 4.5.2 (1) and 4.6.1, using toluene as a liquid (immersion time: 22+/-0.25 hours).

The limitation of the mass change Dm is made from viewpoints shifted from a JIS(A) hardness and the like indicating the hardness of the surface of rubber. That is, the limitation is made from the point of view of the crosslinking of rubber. By increasing the mass change Dm and tearing strength TR, the crack resistance of the cushion rubber G1 can be effectively increased.

If the elongation at breakage EB and mass change Dm exceed the above range, the cushion rubber tends to be excessively soft, and the deformation thereof increases and as a result, belt edge loosening may be caused. If the elongation at breakage EB and mass change Dm are below the above range, the cushion rubber G1 tends to be excessively hard, and as a result, it is easily cracked.

In the present invention, it is very important that the thickness d1 of the cushion rubber defined as the minimum distance between the axially outer end of the first belt ply 7A and the carcass 6 is set in the range of from 1.0 to 5.0 mm. Further, the thickness d1 is set to be less than a rubber thickness d2 between the second and third plies defined as the minimum distance measured at the axially outer end of the third belt ply 7C.

Figure 3:
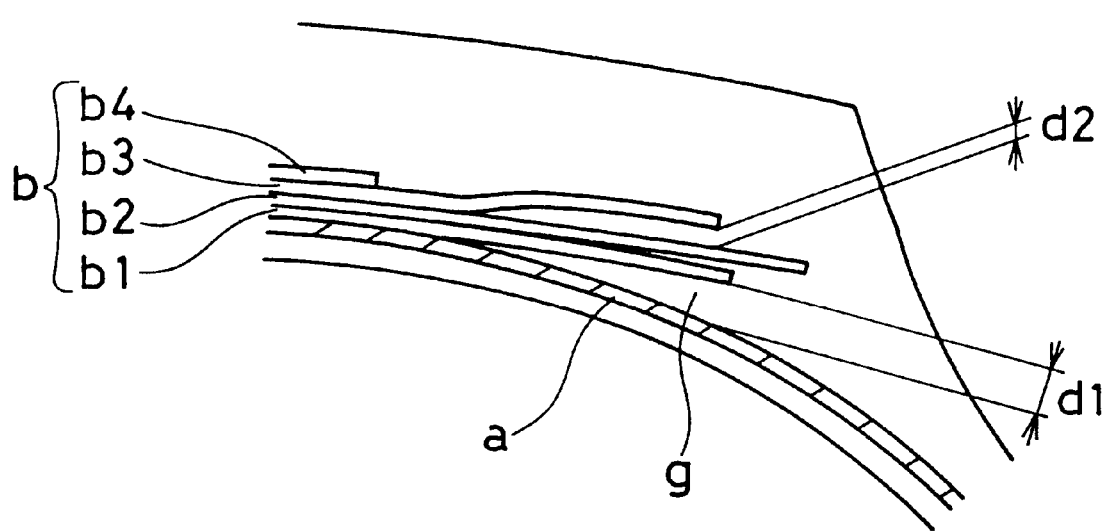
FIG. 3 is a cross sectional view for explaining the prior art.

In the conventional tire, as shown in FIG. 3, the thickness d1 is larger than the thickness d2. As a result, the strain of the belt is accumulated in the thicker cushion rubber at the belt edge.

However, according to the present invention, the strain is dispersed to the rubber between the second and third plies as well as the cushion rubber G1. Therefore, belt edge loosening can be prevented.

If the cushion rubber thickness d1 is less than 1.0 mm, the belt cord ends of the first ply 7A come near the rigid carcass cords, and the cords tend to separate from the rubber. If the thickness d1 exceeds 5.0 mm, it is difficult to make the tire without changing the belt ply profilers.

Preferably, the thickness d2 is set in the range of from 2.0 to 5.5 mm.

Here, the rubber thickness is defined as a distance between the cords.

In this example, the rubber G2 which is disposed between the second and third plies to provide the above-mentioned distance d2 is the same rubber compound as the cushion rubber.

According to the present invention, the axial distance W0 between the axially outer end of the first ply 7A and the axially inner end P of the cushion rubber G1 is set in the range of from 10.0 to 25.0 mm, whereby a strain at the outer end is decreased.

If the axial distance W0 is less than 10.0 mm, the strain can not be effectively decreased. If the axial distance W0 exceeds 25.0 mm, the steering stability deteriorates.

Further, it is required that a difference (W1−W2) is 0 to 5.0 mm, wherein

W1 is the axial distance between the axially outer end of the first ply 7A and the axially outer end of the second ply 7B, and W2 is the axial distance between the axially outer end of the second ply 7B and the axially outer end of the third belt ply 7C.

As a result, the rigidity of the axially outer end portion of the first ply 7A is improved. If the difference (W1−W2) is negative, that is, the first ply 7A is wider than the third ply 7C, a strain is liable to concentrate on the end of the first ply 7A, which is thus not preferable.

Test tires having the basic structure shown in FIG. 1 were made. Then, using a drum tester, the running time until occurrence of loosening was measured, wherein the drum was provided with a protrusion at a position corresponding to the tread shoulder portion of the tire so that the belt edge therein was subjected to stress repeatedly. The test results and tire specifications are shown in Table 1.

TABLE 1

| Tire | Prior | Ex.1 | Ex.2 | Ref.1 | Ref.2 | Ref.3 |
| --- | --- | --- | --- | --- | --- | --- |
| BW/H | 1.2 | 1.2 | 1.2 | 1.2 | 1.2 | 1.2 |
| d1 (mm) | 5 | 2 | 2 | 0.5 | 2 | 2 |
| d2 (mm) | 2 | 4 | 4 | 4 | 4 | 4 |
| W0 (mm) | 20 | 20 | 20 | 5 | 20 | 8 |
| W1−W2 (mm) | 2 | 2 | 2 | 2 | −2 | 2 |
| EB (%) | 400 | 400 | 495 | 400 | 465 | 400 |
| TB (MPa) | 25 | 25 | 31 | 25 | 31 | 25 |
| TR (N/cm) | 485 | 485 | 620 | 485 | 600 | 485 |
| Dm (%) | 280 | 280 | 310 | 280 | 300 | 280 |
| Running time(index) | 100 | 117 | 125 | 95 | 105 | 98 |

TABLE 1-continued

| Tire | Prior | Ex.1 | Ex.2 | Ref.1 | Ref.2 | Ref.3 |
| --- | --- | --- | --- | --- | --- | --- |

Tire size: 385/65
Wheel rim size: 11.75 × 22.5
Speed: 80 km/h
Load: 140% of TRA standard load
Tire pressure: 120 PSI (TRA standard)

From the test results, it was confirmed that example tires according to the invention were increased in the running time, and thus the resistance to belt edge loosening was effectively improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heavy duty radial tire having an aspect ratio of not more than 80%, comprising:

a carcass comprising a ply of cords arranged at an angle of from 70 to 90 degrees with respect to the tire equator;

a belt comprising three plies of parallel cords disposed radially outside the carcass, the three plies including a first radially innermost ply, a second ply and a third ply which are disposed in this order from the radially inside to the outside;

said second ply being widest in the three belt plies and the axial width BW thereof being in the range of from 1.00 to 2.00 times the section height H of the tire;

a first rubber thickness $d1$ defined as the minimum distance from the cords at the axially outer end of the first belt ply to the cords of the carcass being in the range of from 1.0 to 5.0 mm;

an second rubber thickness $d2$ defined as the minimum distance from the cords at the axially outer end of the third belt ply to the cords of the second belt ply being more than said first rubber thickness $d1$;

an axial distance $W1$ of the axially outer end of the first belt ply from the axially outer end of the second belt ply and an axial distance $W2$ of the axially outer end of the third belt ply from the axially outer end of the second belt ply satisfying the following condition: $0 <= W1 - W2 <= 5.0$ mm; and a cushion rubber disposed between the first belt ply and the carcass so as to provide said first rubber thickness $d1$, said cushion rubber tapering axially inwardly so as to have an axially inner end at an axial distance $W0$ of 10.0 to 25.0 mm from the axially outer end of the first belt ply.

2. The heavy duty radial tire according to claim 1, wherein said cushion rubber has an elongation at breakage EB of 480 to 520%,
a tensile strength TB of 28.0 to 32.0 MPa,
a tearing strength TR of 580 to 630 N/cm and
a mass change Dm of 300 to 330%.

3. The heavy duty radial tire according to claim 1, wherein the axial width BW of the widest second belt ply is in the range of from 1.10 to 1.40 times the section height H of the tire.

* * * * *